(12) United States Patent
Wu

(10) Patent No.: US 9,770,636 B1
(45) Date of Patent: Sep. 26, 2017

(54) REAR WHEEL INTERLOCK FOLDING MECHANISM OF GOLF BAG CART

(71) Applicant: SPORTS WORLD ENTERPRISE CO., LTD., Tainan (TW)

(72) Inventor: Fang-Li Wu, Tainan (TW)

(73) Assignee: Sports World Enterprise Co., Ltd., Tainan (TW)

(*) Notice: Subject to any disclaimer, the term of this patent is extended or adjusted under 35 U.S.C. 154(b) by 0 days.

(21) Appl. No.: 15/429,571

(22) Filed: Feb. 10, 2017

(51) Int. Cl.
| | | |
|---|---|---|
| *A63B 57/00* | (2015.01) | |
| *A63B 55/60* | (2015.01) | |
| *B62B 3/12* | (2006.01) | |
| *B62B 3/02* | (2006.01) | |
| *B62B 5/06* | (2006.01) | |

(52) U.S. Cl.
CPC .............. *A63B 55/60* (2015.10); *B62B 3/022* (2013.01); *B62B 3/12* (2013.01); *A63B 2210/50* (2013.01); *B62B 5/06* (2013.01); *B62B 2202/404* (2013.01); *B62B 2205/12* (2013.01); *B62B 2205/20* (2013.01)

(58) Field of Classification Search
CPC ........... A63B 55/60; B62B 3/12; B62B 3/022; B62B 2202/404; Y10S 280/06
See application file for complete search history.

(56) References Cited

U.S. PATENT DOCUMENTS

| | | | | |
|---|---|---|---|---|
| 3,747,150 A | * | 7/1973 | Kozub | A47L 23/22 15/105 |
| 8,544,871 B1 | * | 10/2013 | Liao | B62B 3/02 280/62 |
| 9,004,505 B1 | * | 4/2015 | Wu | B62B 3/022 280/38 |
| 9,371,082 B1 | * | 6/2016 | Wu | B62B 3/022 |
| 2010/0078906 A1 | * | 4/2010 | Pilgrim | B62B 3/12 280/47.22 |
| 2012/0306182 A1 | * | 12/2012 | Liao | B62B 3/02 280/651 |
| 2016/0176427 A1 | * | 6/2016 | Liao | B62B 3/025 280/642 |
| 2016/0184676 A1 | * | 6/2016 | Murabe | B62B 5/0043 180/216 |
| 2016/0185374 A1 | * | 6/2016 | Zhang | B62B 3/02 280/651 |

* cited by examiner

*Primary Examiner* — Brian Swenson
(74) *Attorney, Agent, or Firm* — Rosenberg, Klein & Lee

(57) ABSTRACT

A rear wheel interlock folding mechanism of a golf bag cart is revealed. An upper frame is fixed on an upper-frame connecting rod connected to a lower frame. A rear-wheel connecting rod is fixed on the lower frame and behind the upper-frame connecting rod. A rear-wheel set is set on each end of the rear-wheel connecting rod. The rear-wheel set includes a fixing base fixed on the rear-wheel connecting rod, a bending base pivotally connected to the fixing base, a rear wheel pivotally disposed on the outer end of the bending base, a rotating seat fixed on the upper-frame connecting rod and a link between the bending base and the rotating seat. Thereby the bending base is also moved to drive the rear wheel moving close to the lower frame when the upper frame is folded toward the lower frame. Thus the golf bag cart is folded conveniently.

3 Claims, 9 Drawing Sheets

REAR WHEEL INTERLOCK FOLDING MECHANISM OF GOLF BAG CART

BACKGROUND OF THE INVENTION

Field of the Invention

The present invention relates to a folding mechanism of a golf bag cart, especially to a rear wheel interlock folding mechanism of a golf bag cart by which a bending base of a rear-wheel set is moved along with the upper frame being folded toward the lower frame to drive a rear wheel moving close to the lower frame. Thus the folding process of the golf bag cart is simplified.

Description of Related Art

Golf is an interesting sport with specific skills. Golf players need to walk casually across a golf course so that golf is popular with people of all ages. Most of golf courses are developed by taking advantage of the natural topography and there is a plurality of types of golf courses including mountain course, woods course, river course, hill course, etc. People enjoy the natural environment and feel relaxed. Moreover, the golf versatility has created challenges for all players. Besides their own skills, golf players need to have different types of golf clubs for different shots. In order to carry the clubs with certain weight within the game, a golf bag is required for easy ease of carrying.

Carrying the golf bag is fairly labor-intensive and inconvenient. Thus a golf bag cart has been developed for easy transportation of the golf bag and clubs. The golf bag cart has a certain volume for receiving the golf bag and a bunch of clubs and this has negative effect on the storage of the golf bag cart. Thus different types of foldable golf bag carts have been provided.

The foldable golf bag carts have certain limits while in use although they have a smaller volume for easy storage. During folding process, rear wheels of the golf bag cart needs to be pulled and adjusted manually. The rear wheels are unable to be moved and folded automatically. This causes inconvenience to users.

Thus there is room for improvement and there is a need to provide a novel golf bag cart with a rear wheel interlock folding mechanism that overcomes the above shortcomings.

SUMMARY OF THE INVENTION

Therefore it is a primary object of the present invention to provide a rear wheel interlock folding mechanism of a golf bag cart by which a bending base of a rear-wheel set is moved along with an upper frame being folded toward a lower frame to drive a rear wheel moving close to the lower frame. Thus the folding of the golf bag cart is getting easier and more convenient.

In order to achieve the above object, a rear wheel interlock folding mechanism of a golf bag cart according to the present invention mainly includes a lower frame, an upper frame, and two rear-wheel sets. An upper-frame connecting rod is pivotally connected to a rear end of the lower frame and the upper frame is connected to and fixed on the upper-frame connecting rod. A rear-wheel connecting rod is fixed on the lower frame and located behind the upper-frame connecting rod. The two rear-wheel set are connected to two ends of the rear-wheel connecting rod respectively.

The rear-wheel set includes a fixing base that is assembled and fixed on the rear-wheel connecting rod of the lower frame. A bending base is pivotally connected to an outer side of the fixing base and a rear wheel is pivotally disposed on an outer end of the bending base. A rotating seat is fixed on an outer end of the upper-frame connecting rod of the lower frame and a link is set between the bending base and the rotating seat.

An auxiliary support rod is arranged at the middle part of the rear-wheel connecting rod of the lower frame. The auxiliary support rod includes a limit seat fixed on the middle part of the rear-wheel connecting rod. The limit seat consists of a first limit portion and a second limit portion. A rotating base is disposed on the limit seat while a support portion is extended outward from the rotating base.

A brush is set on the support portion of the auxiliary support rod and used for cleaning dirt and sand from the bottom of the shoes of the players.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

In order to learn technical content, features and functions of the present invention, please refer to the following embodiment, detailed descriptions and related figures.

Figure 1:
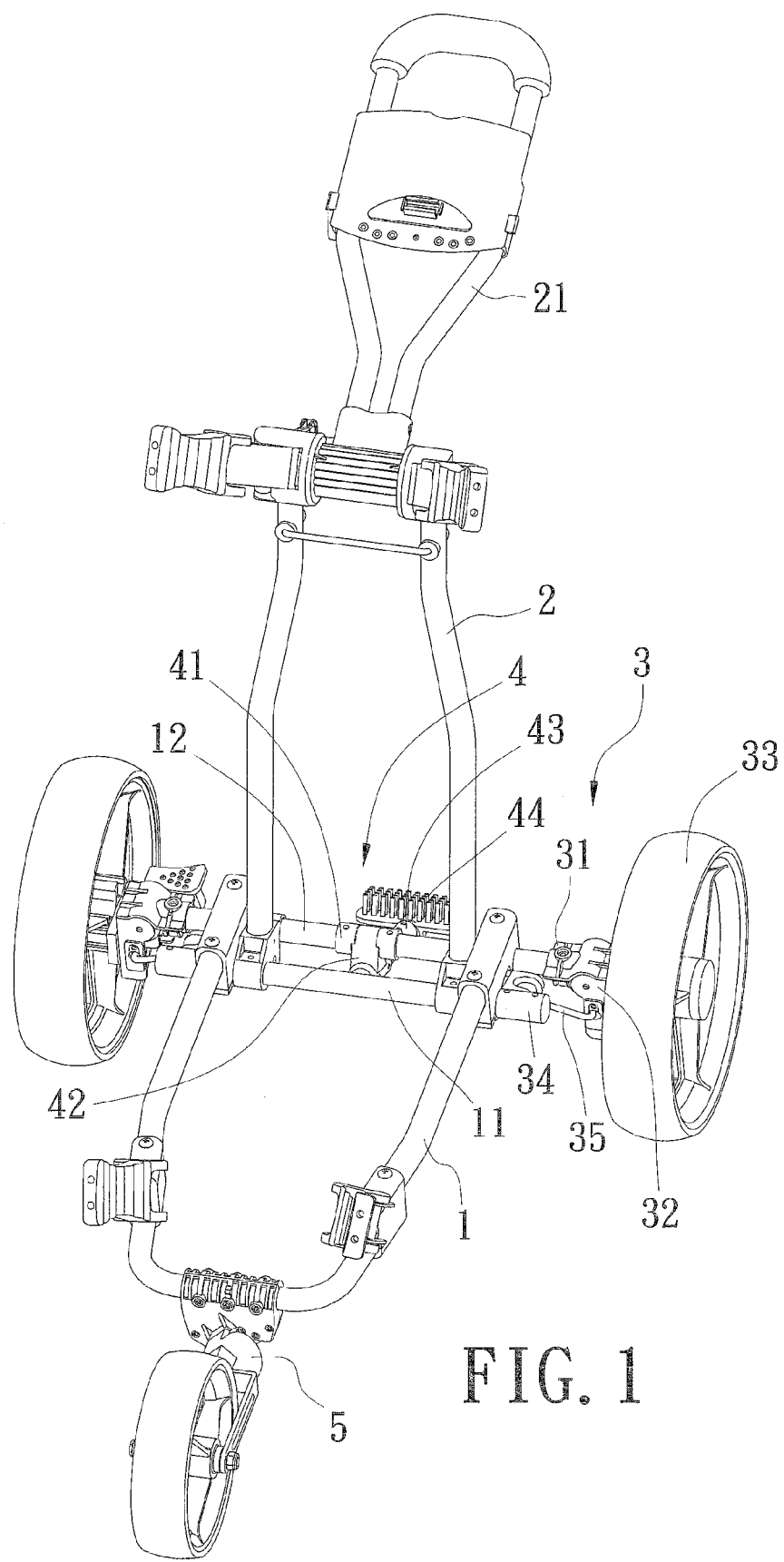
FIG. 1 is a perspective view of an embodiment according to the present invention.

Refer to FIG. 1, a rear wheel interlock folding mechanism of a golf bag cart according to the present invention mainly includes a lower frame 1, an upper frame 2, two rear-wheel sets 3, an auxiliary support rod 4 and a front-wheel set 5. An upper-frame connecting rod 11 is pivotally connected to a rear end of the lower frame 1 and the upper frame 2 is connected to and fixed on the upper-frame connecting rod 11. A handle 21 is pivotally connected to a top end of the upper frame 2. A rear-wheel connecting rod 12 is fixed on the lower frame 1 and located behind the upper-frame connecting rod 11. The rear-wheel sets 3 are disposed on and connected to two ends of the rear-wheel connecting rod 12 respectively. The auxiliary support rod 4 is arranged at the middle part of the rear-wheel connecting rod 12 while the front-wheel set 5 is connected to the front end of the lower frame 1.

Figure 2:
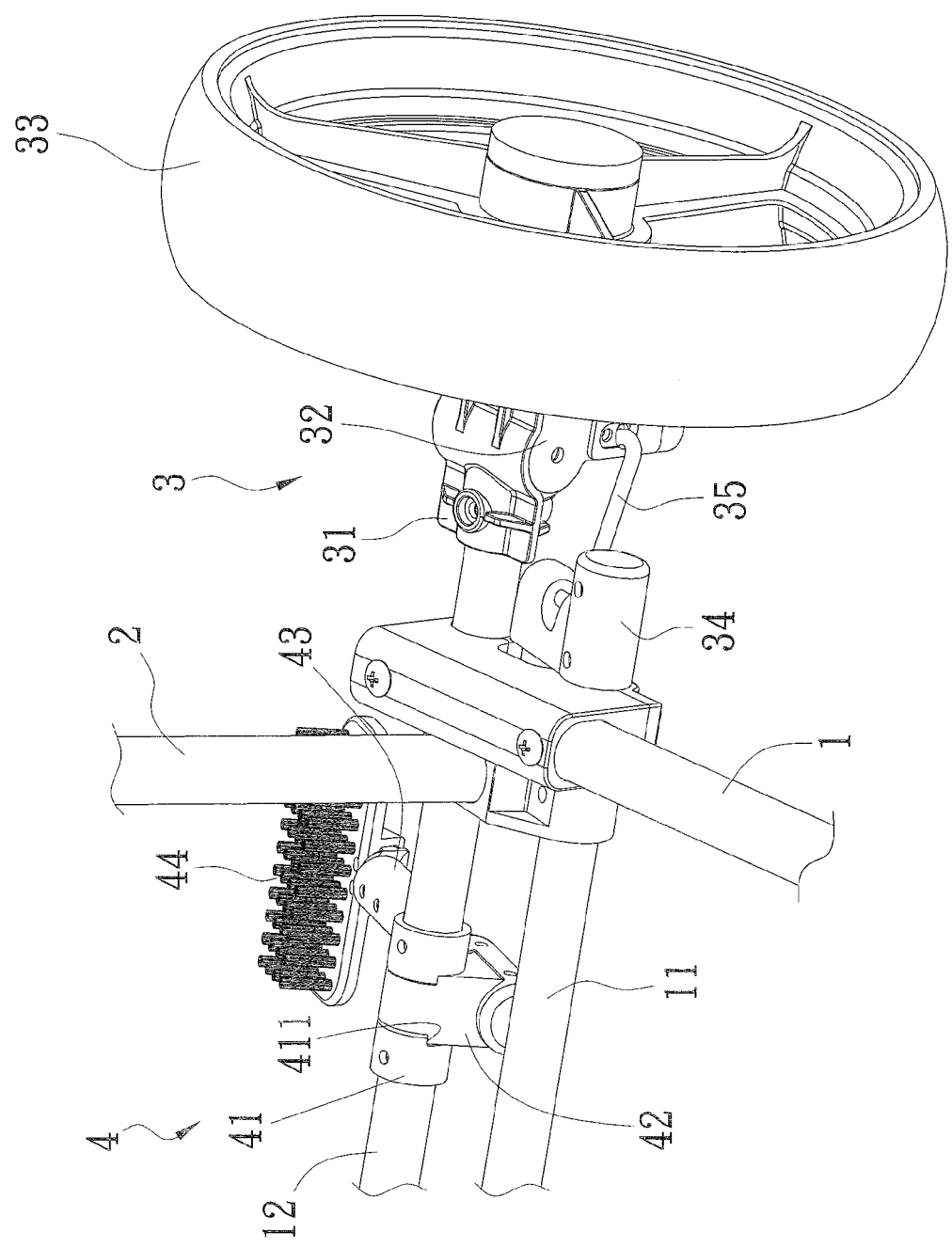
FIG. 2 is a partial enlarged view of an embodiment according to the present invention.

Refer to FIG. 2, each rear-wheel set 3 includes a fixing base 31, a bending base 32, a rear wheel 33, a rotating seat 34 and a link 35. The fixing base 31 is assembled and fixed on the rear-wheel connecting rod 12 of the lower frame 1 and the bending base 32 is pivotally connected to an outer side of the fixing base 31. The rear wheel 33 is pivotally disposed on an outer end of the bending base 32. The rotating seat 34 is assembled and fixed on an outer end of the upper-frame connecting rod 11 of the lower frame 1 and the link 35 is connected to and arranged between the bending base 32 and the rotating seat 34.

Figure 3:
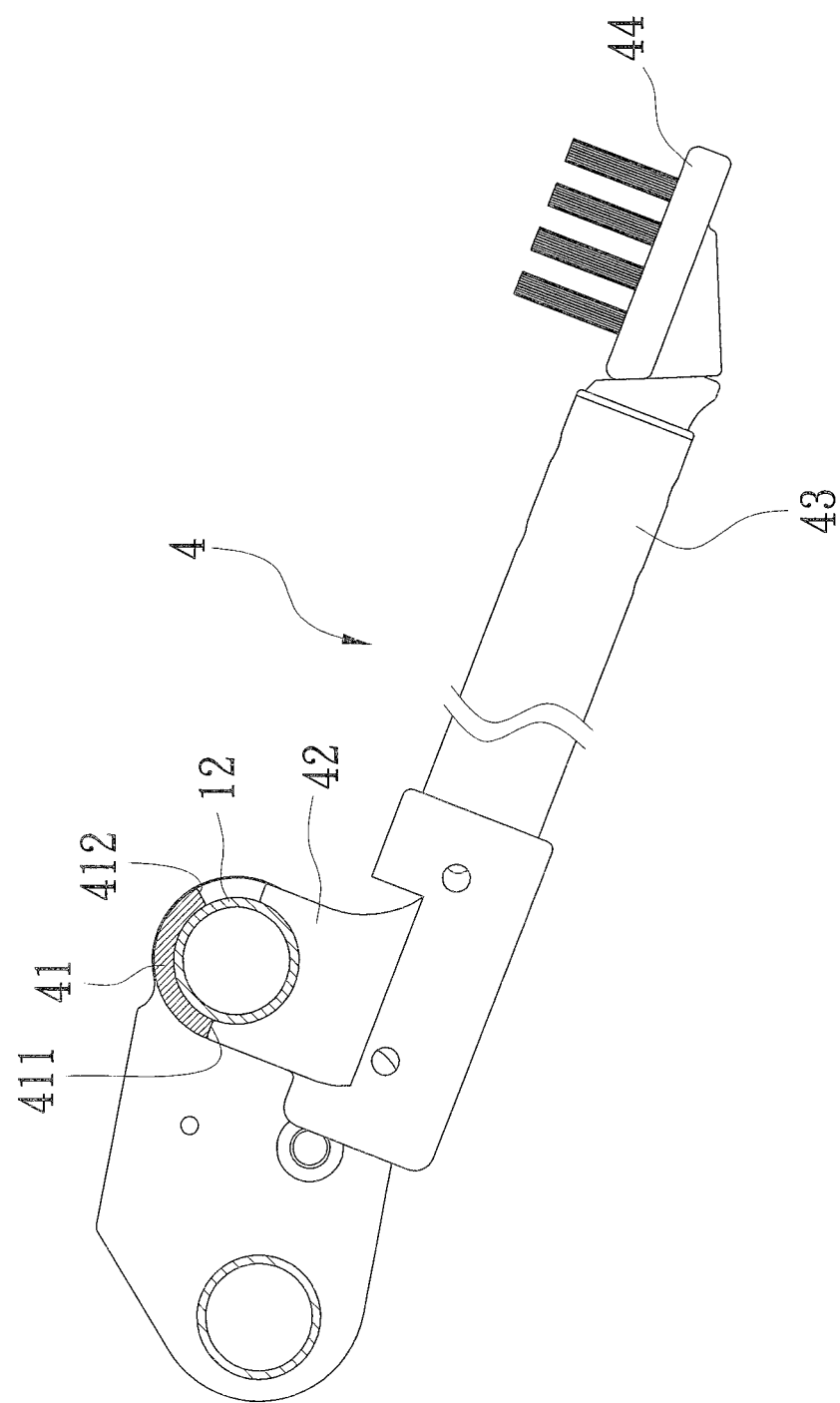
FIG. 3 is a schematic drawing showing a section of an auxiliary support rod of an embodiment according to the present invention.
Figure 4:
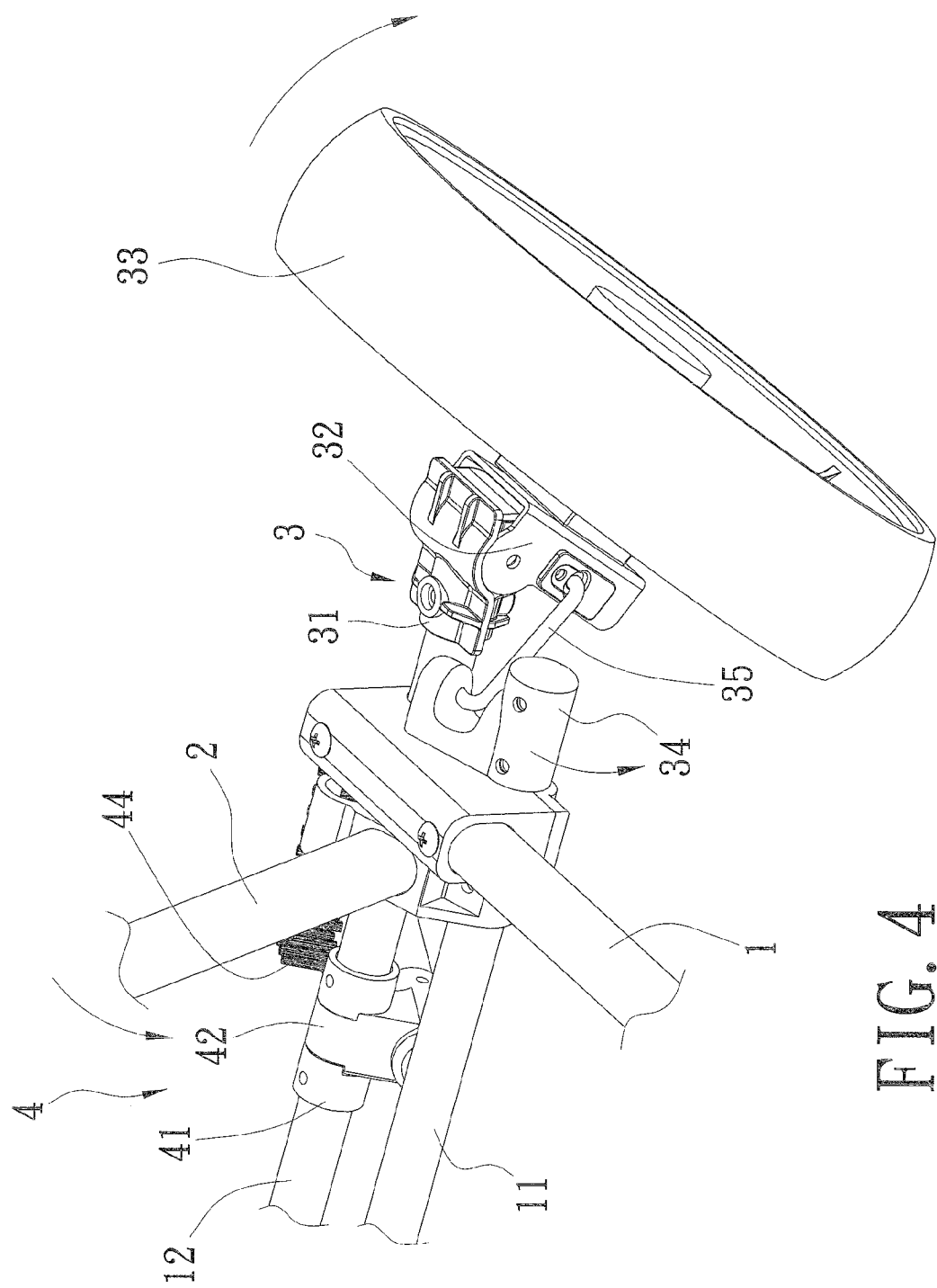
FIG. 4 is a schematic drawing showing folding of a rear-wheel set of an embodiment according to the present invention.

Refer to FIG. 2 and FIG. 3, the auxiliary support rod 4 consists of a limit seat 41, a rotating base 42, a support portion 43 and a brush 44. The limit seat 41 is set and fixed on the middle part of the rear-wheel connecting rod 12 of the lower frame 1. The limit seat 41 includes a first limit portion 411 and a second limit portion 412 respectively. The rotating base 42 is disposed on the limit seat 41 while the support portion 43 is extended outward from the rotating base 42. Under normal condition, the rotating base 42 is driven by the gravity of the support portion 43 to lean against the first limit portion 411 of the limit seat 41. The brush 44 is set on the other end of the support portion 43 and used to clean dirt and sand from the bottom of the shoes of the players.

Figure 5:
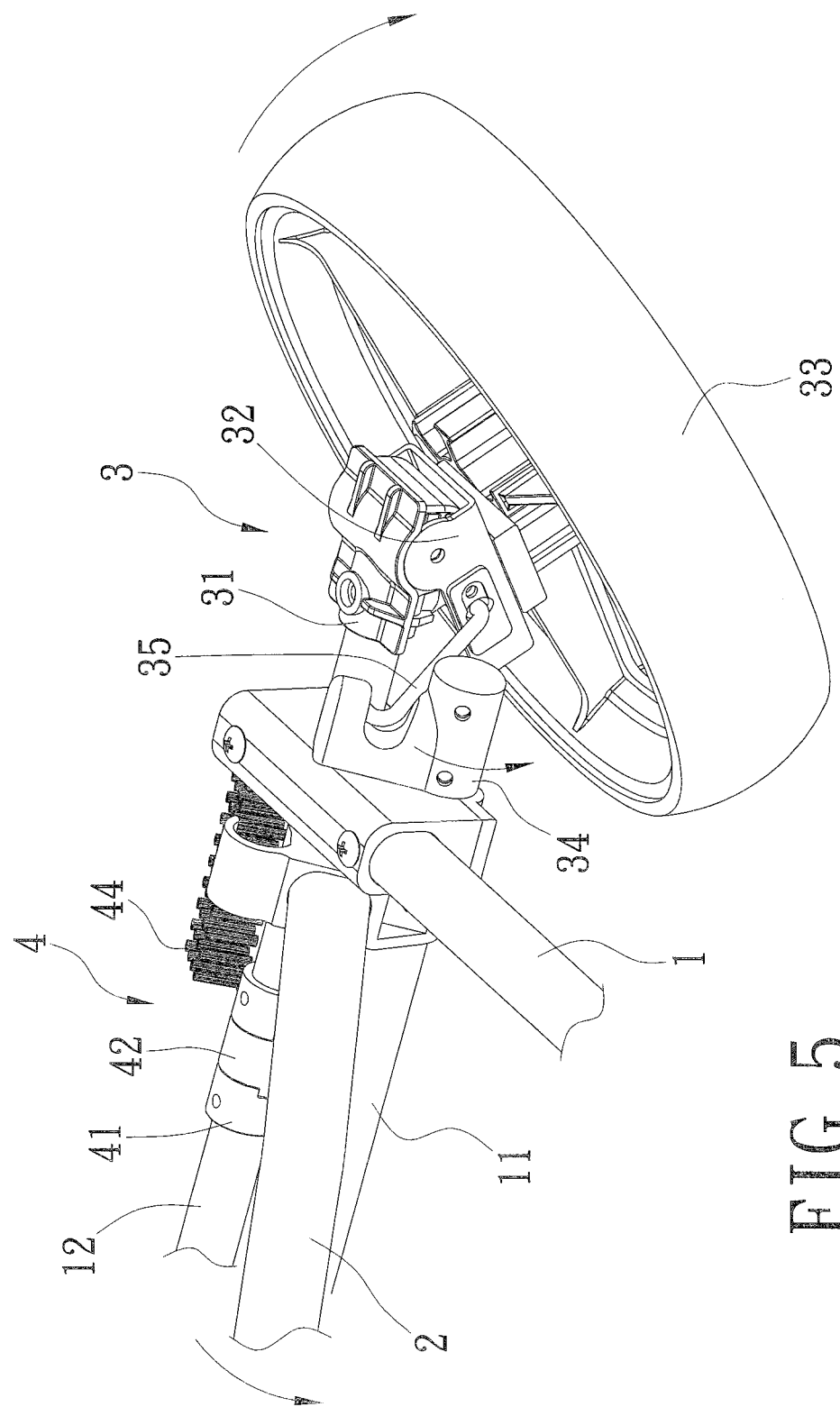
FIG. 5 is another schematic drawing showing folding of a rear-wheel set of an embodiment according to the present invention.
Figure 6:
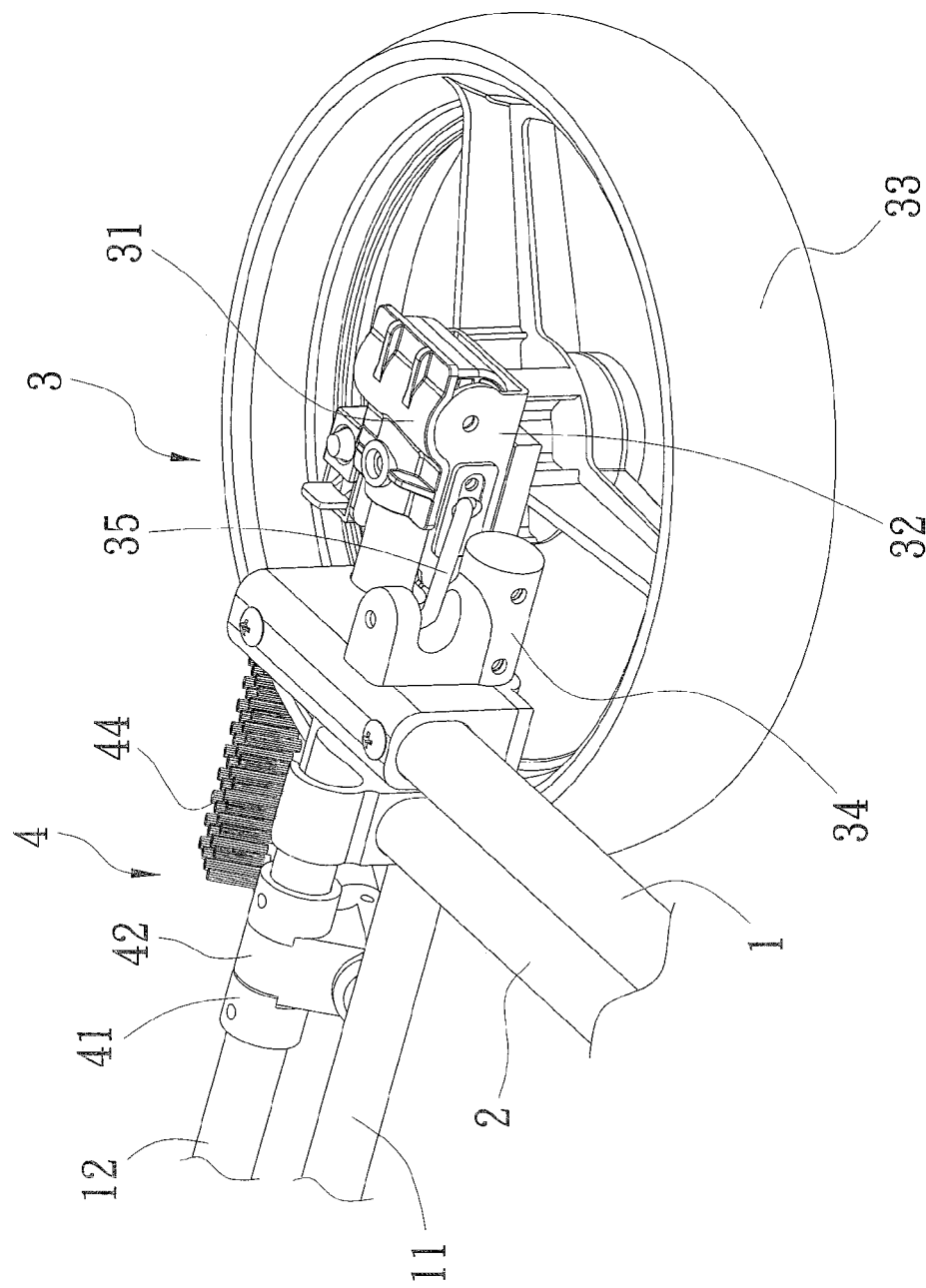
FIG. 6 is a schematic drawing showing a rear-wheel set already folded of an embodiment according to the present invention.

While not in use, the upper frame 2 is pressed downward and the upper-frame connecting rod 11 is pivotally connected to a rear end of the lower frame 1 is driven to rotate because that the upper frame 2 is connected to and fixed on the upper-frame connecting rod 11 of the lower frame 1. Now the rotating seat 34 of the rear wheel set 3 on the outer end of the upper-frame connecting rod 11 is also rotated. The rotating seat 34 is connected to the bending base 32 by the link 35. Thus the link 35 is also acted during rotation of the rotating seat 34 to move the bending base 32 downward. Therefore the rear wheel 33 on the outer end of the bending base 32 is also driven to move downward, as shown in FIG. 5. Refer to FIG. 6, after the upper frame 2 has been moved and attached to the lower frame 1 completely, the bending base 32 drives the rear wheel 33 to be horizontally attached to the bottom of the lower frame 1.

Figure 7:
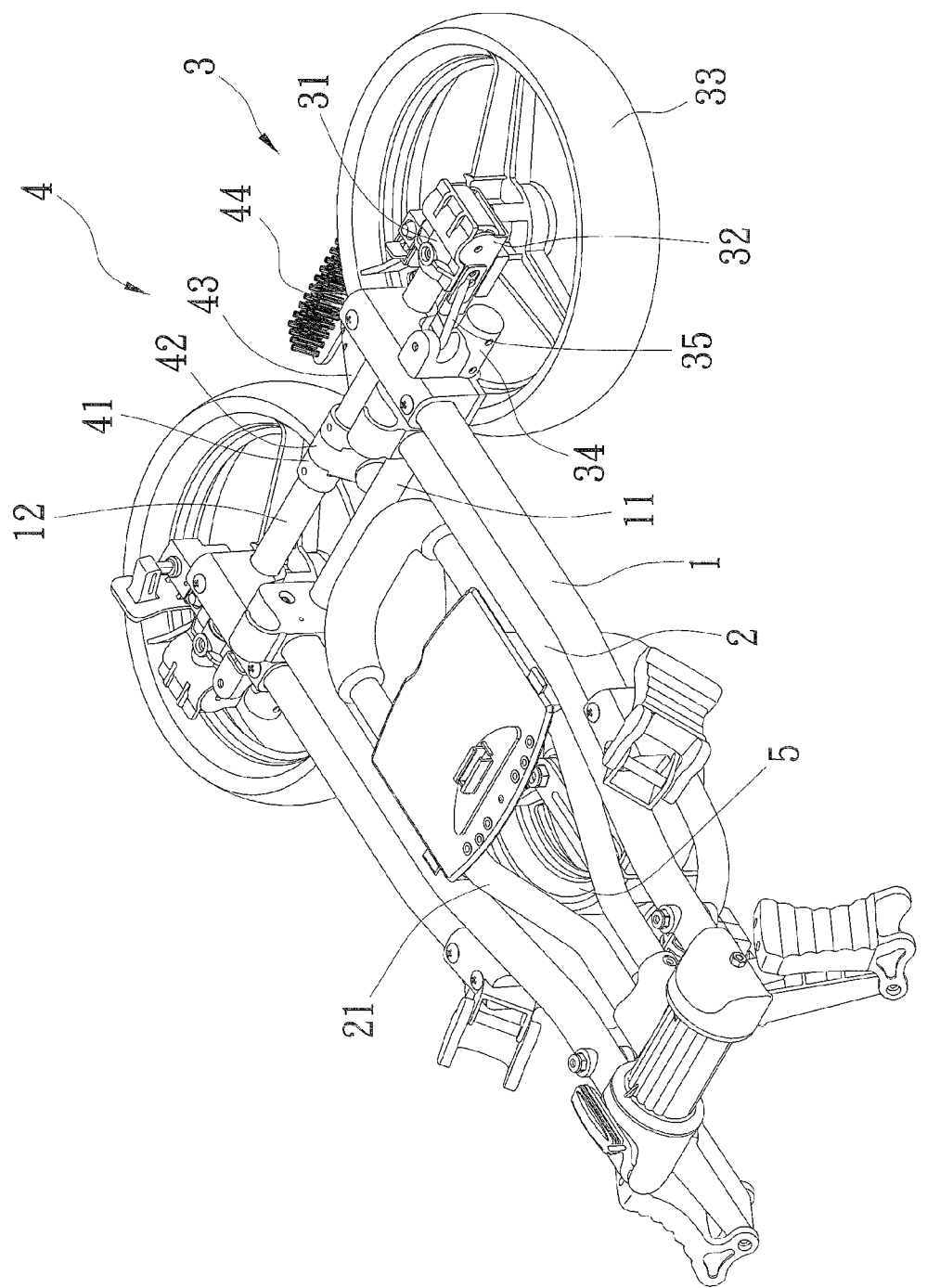
FIG. 7 is a perspective view of an embodiment being folded according to the present invention.
Figure 8:
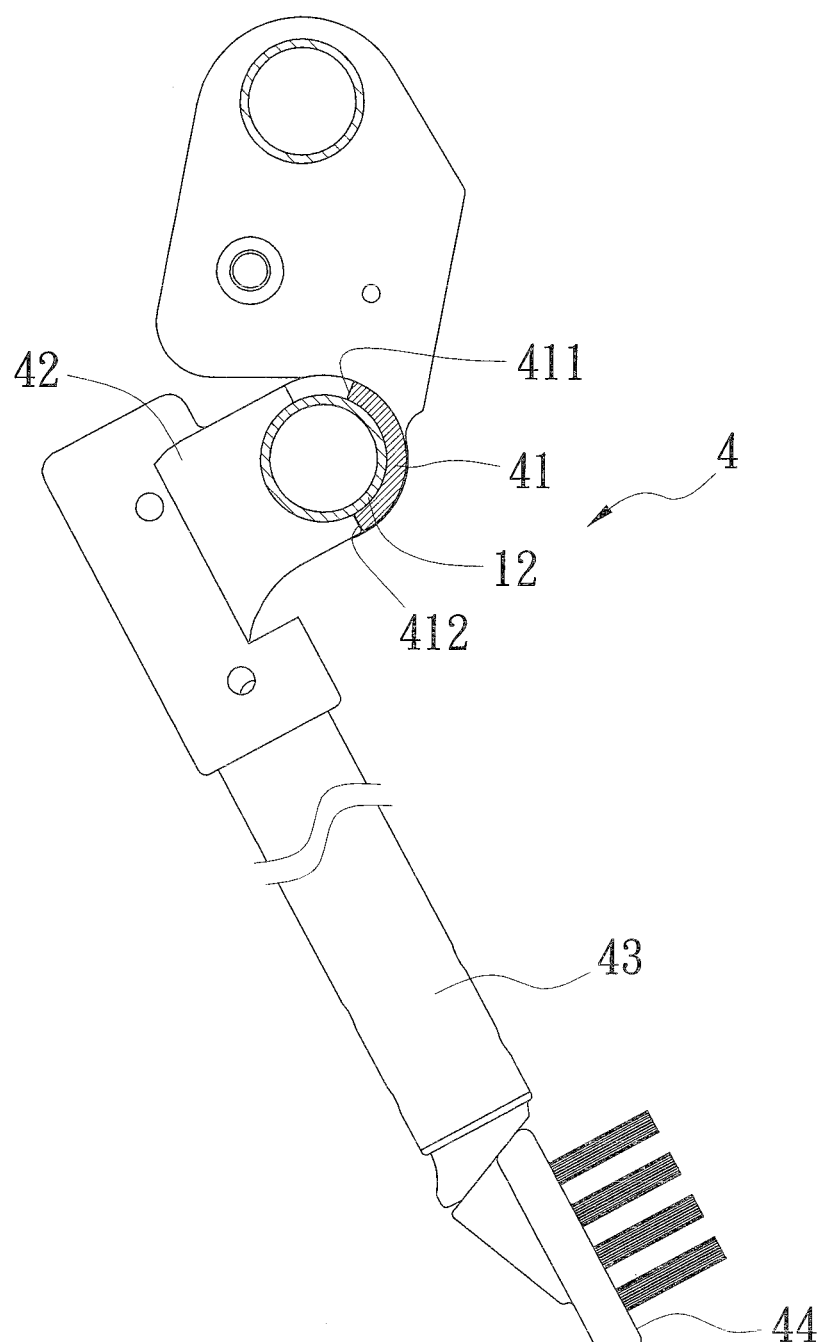
FIG. 8 is a schematic drawing showing a section of an auxiliary support rod in use of an embodiment according to the present invention.
Figure 9:
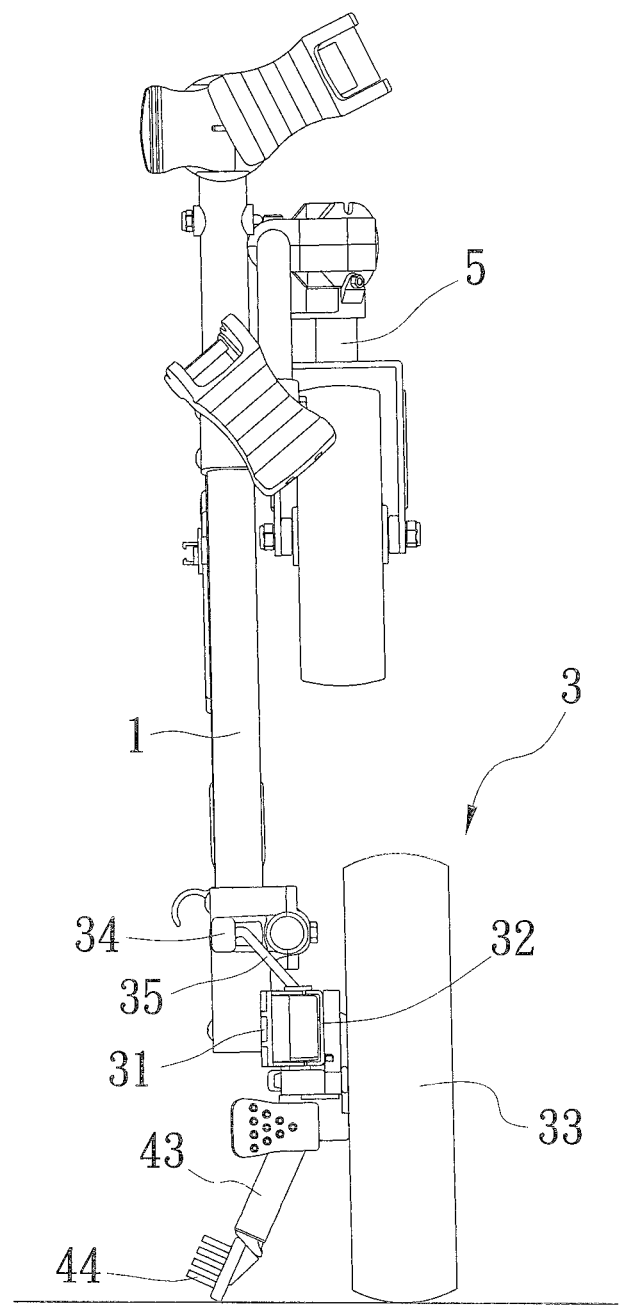
FIG. 9 is a perspective view of an embodiment being folded and set vertically according to the present invention.

Refer to FIG. 7, the handle 21 of the upper frame 2 is folded to be horizontally attached to the bottom surface of the lower frame 1 after the rear wheel 33 driven by the bending base 32 to be horizontally attached to the bottom of the lower frame 1. The front-wheel set 5 is also bent and folded to be under the lower frame 1. At the moment, the golf bag cart can be pulled upward to be supported by the rear wheel 33 of the rear-wheel set 3 and standing upright on the ground. The support portion 43 of the auxiliary support rod 4 is also swung outward to drive the rotating base 42 against the second limit portion 412 of the limit seat 41, as shown in FIG. 8. Thus the golf bag cart can be stored vertically with the assistance of the support portion 43, as shown in FIG. 9.

In summary, the present invention features on that the bending base of the rear-wheel set is also moved to drive the rear wheel to be moved close to and attached to the lower frame while the upper frame is folded toward the lower frame compared with the structure available now. Thus the golf bag cart is folded easily and conveniently.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A rear wheel interlock folding mechanism of a golf bag cart comprising:
    a lower frame disposed with an upper-frame connecting rod pivotally connected to a rear end thereof and a rear-wheel connecting rod located behind the upper-frame connecting rod;
    an upper frame connected to and fixed on the upper-frame connecting rod, and
    two rear-wheel sets arranged at and connected to two ends of the rear-wheel connecting rod respectively;
    wherein each rear-wheel set includes a fixing base that is assembled and fixed on the rear-wheel connecting rod of the lower frame, a bending base pivotally connected to an outer side of the fixing base, a rear wheel pivotally disposed on an outer end of the bending base, a rotating seat fixed on an outer end of the upper-frame connecting rod of the lower frame, and a link arranged between the bending base and the rotating seat.

2. The device as claimed in claim 1, wherein an auxiliary support rod is set at a middle part of the rear-wheel connecting rod of the lower frame; the auxiliary support rod includes a limit seat fixed on the middle part of the rear-wheel connecting rod, a rotating base disposed on the limit seat, and a support portion extended outward from the rotating base; the limit seat having a first limit portion and a second limit portion.

3. The device as claimed in claim 2, wherein a brush is set on the support portion of the auxiliary support rod and used for cleaning dirt and sand from a bottom of shoes of golf players.

\* \* \* \* \*